Dec. 28, 1943.    G. K. NEWELL    2,337,766
BRAKE CYLINDER DEVICE
Filed Feb. 27, 1943
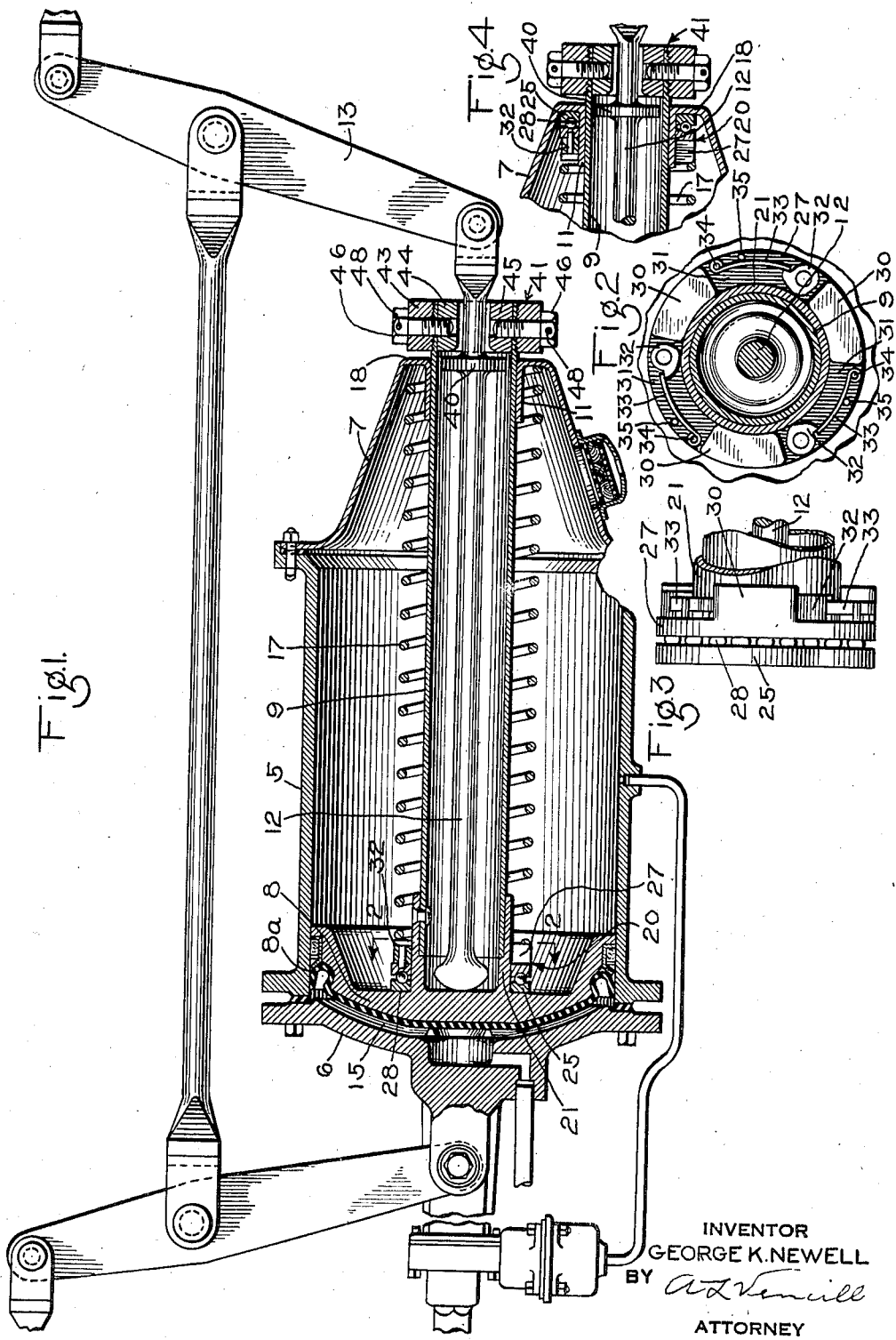
INVENTOR
GEORGE K. NEWELL
BY
ATTORNEY Patented Dec. 28, 1943

2,337,766

UNITED STATES PATENT OFFICE 2,337,766

BRAKE CYLINDER DEVICE

George K. Newell, near Pitcairn, Pa., assignor to The Westinghouse Air Brake Company, Wilmerding, Pa., a corporation of Pennsylvania Application February 27, 1943, Serial No. 477,397

10 Claims. (Cl. 121—1)

This invention relates to fluid pressure motors, and more particularly to a brake cylinder assembly having means for effecting gradual rotation of the piston.

Various mechanical devices have been proposed for effecting gradual rotation of the piston in a brake cylinder of the class employed in a railway air brake equipment, to the end that lubricant may be evenly distributed over the inner wall of the cylinder, and to prevent the effects of wearing from being concentrated at any single point. It is a principal object of my invention to provide a brake cylinder assembly having improved means automatically operative to turn the piston and piston rod sleeve of a brake cylinder device in increments, or steps, in response to repeated operations of the piston while in regular service.

Another object of the invention is to provide a piston revolving means of the above type which may be inexpensively constructed and installed in either new or used brake cylinder apparatus, with minimum expenditure for labor and material.

Other objects and advantages of the invention will appear in the following more detailed description, taken in connection with the accompanying drawing, in which Fig. 1 is an elevational view, mainly in section, of a portion of an air brake equipment including a brake cylinder embodying the invention in one form;

Fig. 2 is a fragmentary sectional view, somewhat enlarged, taken along the line 2—2 of Fig. 1;

Fig. 3 is a side elevational view of the elements shown in Fig. 2, and

Fig. 4 is a fragmentary view, mainly in section, of a brake cylinder equipped with piston rotating mechanism constructed according to a different form of the invention.

Apparatus shown in Fig. 1

As shown in Fig. 1 of the drawing, a typical air brake installation may include a brake cylinder comprising a cylinder section 5 closed at one end by a pressure head 6 and at the opposite end by a non-pressure head 7, and containing a piston 8 having a flange or collar 21 to which is secured a hollow piston rod sleeve 9. The piston rod sleeve 9 is mounted in sliding engagement with an inverted or retrorse cylindrical flange portion 11 of the non-pressure head 7, and encloses the usual loosely mounted push rod 12, the inner end of which abuts the piston 8 and the outer end of which has a clevis portion for pivotal connection to a brake lever 13. It will be understood that the piston 8 is adapted to move to the right, as viewed in Fig. 1, upon admission of compressed air to a chamber 15 at the pressure side thereof, when the air brake system is operated to effect an application of the brakes. A flexible packing cup 8a is attached to the piston 8 for minimizing leakage of compressed air.

A coil spring 17 is provided for shifting the piston 8 from brake application position toward the release position in which it is shown in the drawing, this spring being interposed between an end wall 18 of the non-pressure head 7 and the spring seat surfaces of an annular piston rotating device 20, which encircles the collar 21 of the piston 8 to which the piston sleeve 9 is attached, and which embodies novel features of the invention hereinafter described.

According to my invention, the piston rotating mechanism 20 is constructed and arranged to utilize the normal torque developed by the relatively long coil spring 17 in turning about its axis in an unwinding direction as it is compressed or distorted, and in recoiling to its original condition when expanding as the distorting force is released. A coil spring of the type employed in a brake cylinder, when subjected to maximum distortion with one end held stationary, may be expected to rotate through an arc mounting to about 15° at the free end. Mounted in an ordinary brake cylinder assembly, such a spring may be observed to cause the piston to follow a spiral path, a point on the periphery of the piston rotating back and forth approximately ¼ of an inch with respect to a line parallel to the axis, as the piston reciprocates through an eight inch stroke, for example. With a brake cylinder assembly constructed and arranged in accordance with my invention, this natural tendency of the release spring to uncoil and recoil is rendered effective to cause the piston to move through a straight path preferably on its brake application stroke, and to return through a spiral path in releasing the brakes, so that as a result the piston is gradually rotated, as repeated applications of the brakes are effected.

Referring to Fig. 1 of the drawing, the piston rotating mechanism 20 comprises a ball bearing race or ring 25 fixed about the collar 21 in abutting relation with the piston 8, an annular clutch device 27 rotatably mounted on the collar 21 for engagement by the end of the release spring 17, and a plurality of ball bearings 28 which are interposed and retained between suitably formed bearing faces of the ring 28 and friction device 27.

The annular clutch device 27 adjacent the release spring 17 has mounted thereon suitable friction locking means operative to permit rotation of the device by the spring during brake application movement of the piston, but preventing relative counterrotation of the device when the spring moves the piston in the opposite or brake release direction. As shown in Fig. 2, the annular clutch device 27 has formed thereon a plurality of arcuate spring seat portions 30, separated by recesses 31 within each of which is mounted a rotary wedge element 32 having a friction face bearing against the collar 21 of the brake cylinder piston. Leaf springs 33 are mounted in the recesses 31 on pins 34 in cooperation with stop pins 35, and are arranged to bias the respective rotary wedge elements 32 into frictional engagement with the collar 21. It will be noted that the wedge elements 32 shown in Fig. 2 are constructed and arranged, with relation to the coil spring 17 as illustrated in Fig. 1, to permit the annular clutch device 27 to rotate clockwise with respect to the collar 21 carried by the associated piston, and to prevent relative movement between the same elements in the opposite direction.

The mode of operation of the brake cylinder device constructed in accordance with the invention will now be apparent, it being understood that with the element assembled and the piston 8 in release position as shown in Fig. 1, the release spring 17 is maintained under an initial flexure or distorting force sufficient to hold the one end of the spring in fixed frictional engagement with the end wall 18 of the non-pressure head 7, and the opposite end similarly in fixed relation with the rotary clutch device 27 of the mechanism 20. When the piston 8 is moved to the right under the pressure of air in the chamber 15, the coil spring 17 is compressed and the resultant unwrapping or unwinding torque thereof effects turning of the rotary clutch device 27 on the ball bearings 25. As viewed in Fig. 2, the direction of rotation of the clutch device 27 is clockwise, and since the rotary wedge elements 32 are adapted to permit such motion relative to the collar 21, the piston is permitted to travel in a straight path.

When compressed air is released from the brake cylinder chamber 15, the release spring 17 is rendered operable to force the piston toward release position. As hereinbefore explained, the recoiling torque of the expanding spring 17 then causes counterclockwise rotation of the rotary clutch device 27, as viewed in Fig. 2, due to the frictional engagement of the end of the spring with the spring seat portions 30, with the result that the wedge elements 32 are forced into gripping engagement with the collar 21 of the associated piston. The piston 8 is thus not only shifted toward release position, but is also turned on its axis, along with the clutch device 27, under the recoiling torque exerted by the coil spring 17. This rotary movement of the piston is facilitated during the release operation because of the fact that the frictional resistance between the flexible packing cup 8a and the wall of the cylinder has been reduced by the release of compressed air from the chamber 15.

Subsequent operations of the brake cylinder device will result in further gradual rotation of the piston 8, the unwinding motion of the spring 17 during each movement of the piston 8 to the right being spent in independent rotation of the clutch device 27 relative to the piston, while the recoiling force of the spring exerted during movement of the piston in the other direction will be effective to turn both the clutch device 27 and the piston about the axis of the assembly as just explained. Although the rate of rotation of the piston will be slow, amounting approximately to one revolution for each 60 operations of the brake cylinder device in a typical brake equipment, adequate distribution of wear and efficient lubrication of the brake cylinder assembly will be insured.

The brake cylinder equipment shown in Fig. 1 is also provided with means for transmitting the pulling force of the return spring 17 to the brake rigging during release movement of the apparatus, in order to effect return of the rigging elements to release position. For this purpose, the push rod 12 has a shoulder or flange 40 formed near the outer end thereof, which is adapted for engagement with a retainer ring assembly 41 removably mounted on the free end of the piston rod sleeve 9 outwardly of the non-pressure head 7. The retainer ring assembly 41, in the form illustrated, comprises a ring 43 having screw-threaded connection with the piston rod sleeve 9, a pair of arcuate lugs 44 and 45 fitted interiorly of the sleeve, and a plurality of bolts 46 for securing the parts together. Suitable means may be provided for preventing accidental loosening of the bolts 46, such as a wire 48 that may be passed through the apertures 48 in the bolts. It will be evident that the lugs 44 and 45 are thus adapted to engage the flange 40 for ensuring movement of the rod 12 to release position, regardless of the relative rotation of the piston rod sleeve.

*Embodiment shown in Fig. 4*

If desired, the piston rotating mechanism may be mounted in the non-pressure head 7, as shown in Fig. 4, instead of in the location as illustrated in Fig. 1. As shown in Fig. 4, the conical portion of the non-pressure head 7 is partially closed by the end wall 18, which terminates in the retrorse flange 11 through which is slidably fitted the piston sleeve 9 containing the solid piston rod 12. In this design the piston rotating mechanism 20 surrounds the flange 11, the ball-bearing race or ring 25 being disposed adjacent the wall 18 and the rotary clutch device 27 being arranged for cooperation with the flange in accordance with torque exerted by the coil spring 17.

During operation of the apparatus illustrated in Fig. 4, when the spring 17 is compressed during movement of the associated piston to effect an application of the brakes, the resultant unwinding motion of the spring effects rotation of the rotary clutch device 27 in the direction in which it is free to turn, as already explained. When the spring 17 is later permitted to move the piston toward release position, however, the torque of the spring in recoiling is not effective to turn the rotary clutch device 27, since that device is then automatically locked against the flange 11, so that the piston frictionally engaged by the opposite end of the spring receives the entire torque thereof and is turned accordingly.

From the foregoing description, it will be evident that a brake cylinder equipment embodying either form of my improved piston rotating mechanism can be economically constructed, and may thereafter be maintained in proper operating condition for longer periods of service, between regular inspections, than would be expedient in the case of a standard brake cylinder.

Having now described my invention, what I claim as new and desire to secure by Letters Patent, is:

1. In a fluid pressure motor, in combination, a cylinder, a piston reciprocative therein, a coil return spring urging the piston toward a normal position, and means cooperative with said spring for causing the alternate unwinding and recoiling torque thereof to effect gradual unidirectional rotation of the piston.

2. In a fluid pressure motor, in combination, a cylinder, a piston reciprocative therein, a coil return spring urging the piston toward a normal position, and piston rotating means contained in said cylinder and operative to cause the torque exerted in one direction by said spring to rotate said piston during operation thereof, and to prevent the torque exerted by said spring in the opposite direction from turning said piston.

3. In a fluid pressure motor, in combination, a cylinder, a piston reciprocative therein, a coil return spring urging the piston toward a normal position, and piston rotating means operative to apply to said piston the torque exerted in one direction by said spring during operation of the piston, and operative to absorb the torque exerted by said spring in the opposite direction for preventing corresponding reverse rotation of the piston.

4. In a fluid pressure motor, in combination, a cylinder, a piston reciprocative therein, a coil return spring urging the piston toward a normal position, and a rotary clutch mechanism cooperative with one end of said spring, said clutch mechanism being constructed and arranged to absorb the torque produced by said spring during a stroke of said piston in one direction, and to transmit the reverse torque of said spring to said piston during a stroke thereof in the opposite direction, whereby said piston will be gradually rotated on its axis while it is reciprocated within said cylinder.

5. In a fluid pressure motor, in combination, a cylinder, a piston reciprocative therein, a coil return spring urging the piston toward a normal position, and a piston rotating mechanism comprising anti-friction bearing means disposed coaxially of said piston and said spring, spring seat means mounted for rotation in one direction on said bearing means, and means operative to check rotation of said spring seat means relative to said bearing means in the other direction, said spring means being interposed between said bearing means and one end of said coil spring for alternately absorbing and transmitting to said piston the torque exerted by the spring during successive strokes of the piston.

6. In a brake cylinder assembly including a cylinder, a piston mounted therein and having a tubular piston rod slidably extending outwardly of said cylinder, a push rod loosely disposed within said tubular rod, and a coil spring arranged coaxially of said tubular piston rod for urging said piston toward release position, the combination therewith of means actuated by the torque exerted by said piston return spring, during successive strokes of the piston, for effecting gradual unidirectional rotation of said piston and tubular rod.

7. In a brake cylinder assembly including a cylinder, a piston mounted therein and having a tubular piston rod slidably extending outwardly of said cylinder, a push rod loosely disposed within said tubular rod, and a coil spring arranged coaxially of said tubular piston rod for urging said piston toward release position, the combination therewith of means actuated by the torque exerted by said piston return spring, during successive strokes of the piston, for effecting gradual unidirectional rotation of said piston and tubular rod, and means freely interlocking said push rod and said tubular piston rod without interfering with relative rotation of the latter.

8. In a brake cylinder assembly, in combination, a cylinder including a non-pressure head, a piston reciprocative in said cylinder, a coil spring for urging the piston toward a release position, and means interposed between one end of said spring and said non-pressure head and operative in accordance with the alternate unwinding and recoiling torque exerted by said spring to effect gradual unidirectional rotation of said piston during repeated strokes thereof.

9. In a brake cylinder assembly, in combination, a cylinder structure, a piston reciprocative therein and having a tubular sleeve extending coaxially thereof, a coil return spring adapted to urge the piston toward a release position, and an annular piston rotating mechanism interposed between one end of said return spring and said piston, said mechanism being cooperative with said sleeve portion in response to torque exerted by said spring.

10. In a brake cylinder assembly comprising a cylinder body having a pressure chamber, a piston mounted therein having brake release and brake application positions, a flexible packing cup attached to said piston and subject to the pressure of fluid admitted to said pressure chamber, and a coil return spring for opposing brake application movement of said piston under fluid pressure, the combination with said piston of rotating means responsive to torque exerted by said spring during reciprocation of said piston, said rotating means being constructed and arranged to turn the piston upon each movement thereof toward release position following reduction of fluid pressure in said pressure chamber.

GEORGE K. NEWELL.